(12) United States Patent
Yoakum et al.

(10) Patent No.: US 7,573,872 B2
(45) Date of Patent: Aug. 11, 2009

(54) SELECTIVE FORWARDING OF DAMAGED PACKETS

(75) Inventors: John H. Yoakum, Cary, NC (US); Philip Edholm, Pleasanton, CA (US); Francois Audet, Santa Clara, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 833 days.

(21) Appl. No.: 10/676,398

(22) Filed: Oct. 1, 2003

(65) Prior Publication Data

US 2005/0074002 A1 Apr. 7, 2005

(51) Int. Cl.
H04L 12/28 (2006.01)
(52) U.S. Cl. .......................... 370/389; 370/392
(58) Field of Classification Search .............. 370/229, 370/230, 353, 389, 412, 418, 428, 216, 217, 370/218, 219, 220, 221, 231, 469, 392, 474, 370/401, 402, 242
See application file for complete search history.

(56) References Cited

U.S. PATENT DOCUMENTS

| | | | |
|---|---|---|---|
| 5,943,347 A | 8/1999 | Shepard | |
| 6,247,058 B1 * | 6/2001 | Miller et al. | 709/234 |
| 6,266,337 B1 * | 7/2001 | Marco | 370/410 |
| 6,473,875 B1 | 10/2002 | Anderson | |
| 6,487,213 B1 * | 11/2002 | Chao | 370/418 |
| 6,498,791 B2 * | 12/2002 | Pickett et al. | 370/353 |
| 6,606,301 B1 * | 8/2003 | Muller et al. | 370/230 |
| 6,628,641 B1 * | 9/2003 | Strawczynski et al. | 370/349 |
| 6,651,193 B1 * | 11/2003 | Dickey et al. | 714/48 |

(Continued)

FOREIGN PATENT DOCUMENTS

EP 0743777 A2 11/1996

(Continued)

OTHER PUBLICATIONS

Khayam et al., "Performance Analysis and Modeling of Errors and Losses over 802.11b LANs for High-Bit-Rate Real-Time Multimedia," Signal Processing: Image Communication, Aug. 2003, pp. 575-595, vol. 18, No. 7, Elsevier Science Publishers, Amsterdam, NL.

(Continued)

Primary Examiner—Brenda Pham
(74) Attorney, Agent, or Firm—Withrow & Terranova, P.L.L.C.

(57) ABSTRACT

The present invention facilitates the forwarding of damaged packets, when the packets are carrying a certain type of content such as streaming media or other time-sensitive information where data integrity is less important than timely delivery. Once a packet is received, a determination is made as to whether the packet has been damaged. If the packet is damaged, an attempt is made to determine the type of content being carried by the packet and then a decision is made as to whether to forward the packet toward its destination or discard the packet, based on the type of content and potentially the integrity of the packet. Once a damaged packet has been discovered and a decision has been made to route the packet toward the destination terminal, the packet may be forwarded along a normal path or sent over an alternative path that is better suited for handling damaged packets.

36 Claims, 3 Drawing Sheets

U.S. PATENT DOCUMENTS

| | | | |
|---|---|---|---|
| 6,675,344 B1 * | 1/2004 | Sharma | 714/763 |
| 6,700,888 B1 * | 3/2004 | Jonsson et al. | 370/392 |
| 6,785,734 B1 * | 8/2004 | Blasiak et al. | 709/238 |
| 6,826,148 B1 * | 11/2004 | Lee | 370/230 |
| 6,876,705 B2 | 4/2005 | Katsavounidis et al. | |
| 7,069,495 B2 | 6/2006 | Soderberg et al. | |
| 7,248,589 B2 * | 7/2007 | Banerjee et al. | 370/395.32 |
| 7,346,077 B2 * | 3/2008 | Tourunen et al. | 370/469 |
| 2002/0003812 A1 * | 1/2002 | Haartsen | 370/474 |
| 2002/0105971 A1 * | 8/2002 | Tourunen et al. | 370/469 |
| 2003/0035441 A1 | 2/2003 | Cheng et al. | |
| 2005/0074002 A1 * | 4/2005 | Yoakum et al. | 370/389 |

FOREIGN PATENT DOCUMENTS

| | | |
|---|---|---|
| WO | 02/25442 A1 | 3/2002 |

OTHER PUBLICATIONS

Larzon et al., "The UDP-Lite Protocol," IETF Standard—Working-Draft, Aug. 2003, vol: tsvwg, No. 2, Internet Engineering Task Force, IETF, Switzerland.

Supplementary European Search Report for EP 04 76 9125, mailed Aug. 2, 2006.

Larson, Lars-Ake et al., "Efficient Use of Wireless Bandwidth for Multimedia Applications," GLOBECOM '00, Nov. 27 to Dec. 2000, pp. 187-193.

* cited by examiner

SELECTIVE FORWARDING OF DAMAGED PACKETS

FIELD OF THE INVENTION

The present invention relates to packet-based communications, and in particular to selectively forwarding packets that are damaged, based on the type of content carried in the packet.

BACKGROUND OF THE INVENTION

In the emerging world of packet-based communications, packets are increasingly being used to transport content of many types, including streaming media, which needs to be delivered in real time. As new technology, such as wireless local area networks (WLANs) and other access technologies where the transmission path is subject to disturbances, become more prominent, the traditional rules for handling damaged packets may not be applicable for certain types of packet content.

Within the Internet Protocol and other link level protocols, packets having a checksum error, which is indicative of the packet being damaged in any fashion, are immediately discarded. In a wireless WLAN environment, many packets that are damaged may have only a relatively small number of actual bit errors within the packet. If the packet content represents data, such as a bank balance, discarding the damaged packet and requesting a retransmission of the packet is necessary, because retransmission of the packet is the only viable method for assuring that the data is accurately transferred. Further, the delay in receiving the data due to retransmission has minimal if any negative impact on the data transfer. In contrast, if the damaged packet is transporting streaming media that should be delivered in real time, such as audio, voice, or video, the damaged bits within the packet will certainly have a negative impact, but the impact of a few errant bits may not be catastrophic. Since the data is being used in real time, retransmission is relatively useless, because the order in which the packets arrive and their respective delays are critical in using and delivering the content. As such, there is a need for new techniques in handling packets carrying time-sensitive information and wherein data integrity is less important than timely delivery.

SUMMARY OF THE INVENTION

The present invention facilitates the forwarding of damaged packets, when the packets are carrying a certain type of content such as streaming media or other time-sensitive information where data integrity is less important than timely delivery. Once a packet is received, a determination is made as to whether the packet has been damaged. If the packet is damaged, an attempt is made to determine the type of content being carried by the packet and then a decision is made as to whether to forward the packet toward its destination or discard the packet, based on the type of content and potentially the integrity of the packet. The above packet processing may be provided in any number of packet forwarding devices ranging from edge devices facilitating communications with originating or destination terminals over an access network, to intermediate devices through which the packet is routed within a packet network coupling the access networks. The detection of damage and determination of content type may be made in the same or different devices acting in coordination with each other for a given packet. Once a damaged packet has been discovered and a decision has been made to route the packet toward the destination terminal, the packet may be forwarded along a normal path as if it were undamaged, or sent over an alternative path that is better suited for handling damaged packets. In an alternative embodiment, the packet may be modified to include an indication that the packet is damaged to assist devices in routing or processing the packet.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Provided herein, damaged packets are selectively forwarded based on the type of content carried therein. In a preferred embodiment, packets carrying content in which the delivery is time-sensitive, such as content sensitive to latency, jitter, order of packet arrival, or other parameters critical to proper reconstruction of streaming content, may be forwarded even though they are damaged, wherein packets in which the integrity of the content is more critical than the timeliness of delivery are dropped. The entity at the destination for the packet or some intermediate entity along the path will then have the option to attempt to repair, use, or discard the damaged packet. The content of the packet may be used directly or processed in an effort to correct errors or minimize the impact thereof.

Figure 1:
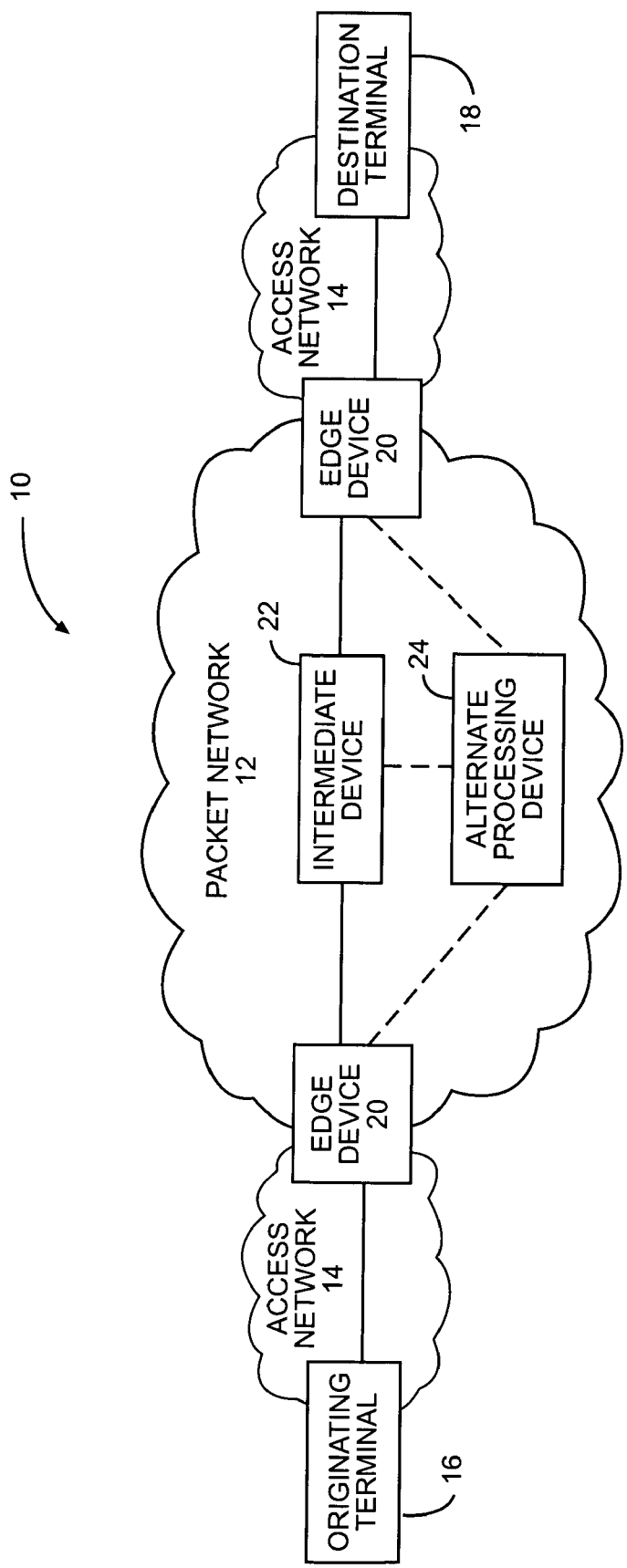
FIG. 1 is a block representation of a communication environment according to one embodiment of the present invention.

With reference to FIG. 1, a communication environment 10 is illustrated in which packets may be selectively forwarded when they are damaged instead of being discarded, based on the type of content carried within the packet. The communication environment 10 includes a packet network 12 and multiple access networks 14, which cooperate to allow an originating terminal 16 to deliver packets to a destination terminal 18. The packet network 12 and the access networks 14 will either include or be associated with any number of packet forwarding devices, which may include edge devices 20 that connect the access networks 14 to the packet network 12 and any number of intermediate devices 22, which effectively forward the packets throughout the packet network 12 from one edge device 20 to another. The packet network 12 may also include an alternate processing device 24, which may optionally be implemented to process or forward damaged packets in a defined fashion when the other packet forwarding devices are not equipped to provide such handling functions. The alternate processing device 24 is described later in the description.

The communication environment 10 may take numerous forms, wherein the various packet forwarding devices may facilitate wireline or wireless communications between each other as well as with the originating and destination terminals 16, 18. For example, the access network 14 may be a cellular network or a wireless local area network. In such an embodiment, the edge device 20 may be a cellular network base station or mobile switching center, as well as a wireless local area network (WLAN) modem or like access point. Further, the edge devices 20 may be implemented in various wireline-type devices, such as routers, firewalls, and servers. Those skilled in the art will recognize wireless implementations of the same. The intermediate devices 22 may take the form of a router, switch, or other entity acting as a forwarding liaison between two other packet forwarding devices. The alternate processing device 24 may take similar forms.

Depending on the embodiment, the packets transported between the originating terminal 16 and the destination terminal 18 may include content of various types, including data or streaming media, such as audio, video, and voice. Although those skilled in the art will recognize other types of content, the content of a packet can normally be broken into two types. A first type is data whose integrity cannot be compromised. As such, the integrity of the content takes priority. The second type of content, such as streaming media, is more sensitive to the time and order in which it is received than the integrity of the content itself. Although content integrity is important, packets that are lost or discarded due to damage may prove more problematic than a few corrupt bits. Origins or destinations of content are not limited to the edges of the access networks and can exist within the packet network in devices such as media servers that are streaming or capturing content as appropriate.

In contrast to the current practice of discarding any damaged packet, the present invention can be implemented on any of the packet forwarding devices and operates to forward damaged packets whose content is of the type which is less sensitive to integrity and more sensitive to timely delivery. As a packet travels from the originating terminal 16 to the destination terminal 18, various ones of the packet forwarding devices will be configured to determine whether a packet has been damaged or otherwise corrupted. Instead of automatically dropping the packet, the packet forwarding device will attempt to determine the type of packet and either drop the packet in traditional fashion or forward the packet toward the destination terminal 18. In this manner, damaged packets having a select type of content may be forwarded in sequential fashion through the packet network 12 and on to the destination terminal 18. In one embodiment, each packet forwarding device will systematically analyze the packet for damage, and determine whether to forward the packet based on the content therein. The packet may be forwarded without change or may be encapsulated in a new packet, which is then forwarded. Depending on the damage to the packet, it may be possible to simply forward the packet unchanged (in this case the packet may have an implicit indication that it is damaged in the form of the layer 2, IP and UDP checksums), thus ignoring the damage, or encapsulate the damaged packet as payload in a new undamaged packet. Alternatively, the first packet forwarding device to detect damage may modify the packet to include some type of explicit indicia indicating the packet has been damaged and forward the packet on toward the destination terminal 18, wherein subsequent packet forwarding devices will be able to determine that the packet is damaged but should be forwarded to the destination terminal 18 based on the damage indicia.

Figure 2:
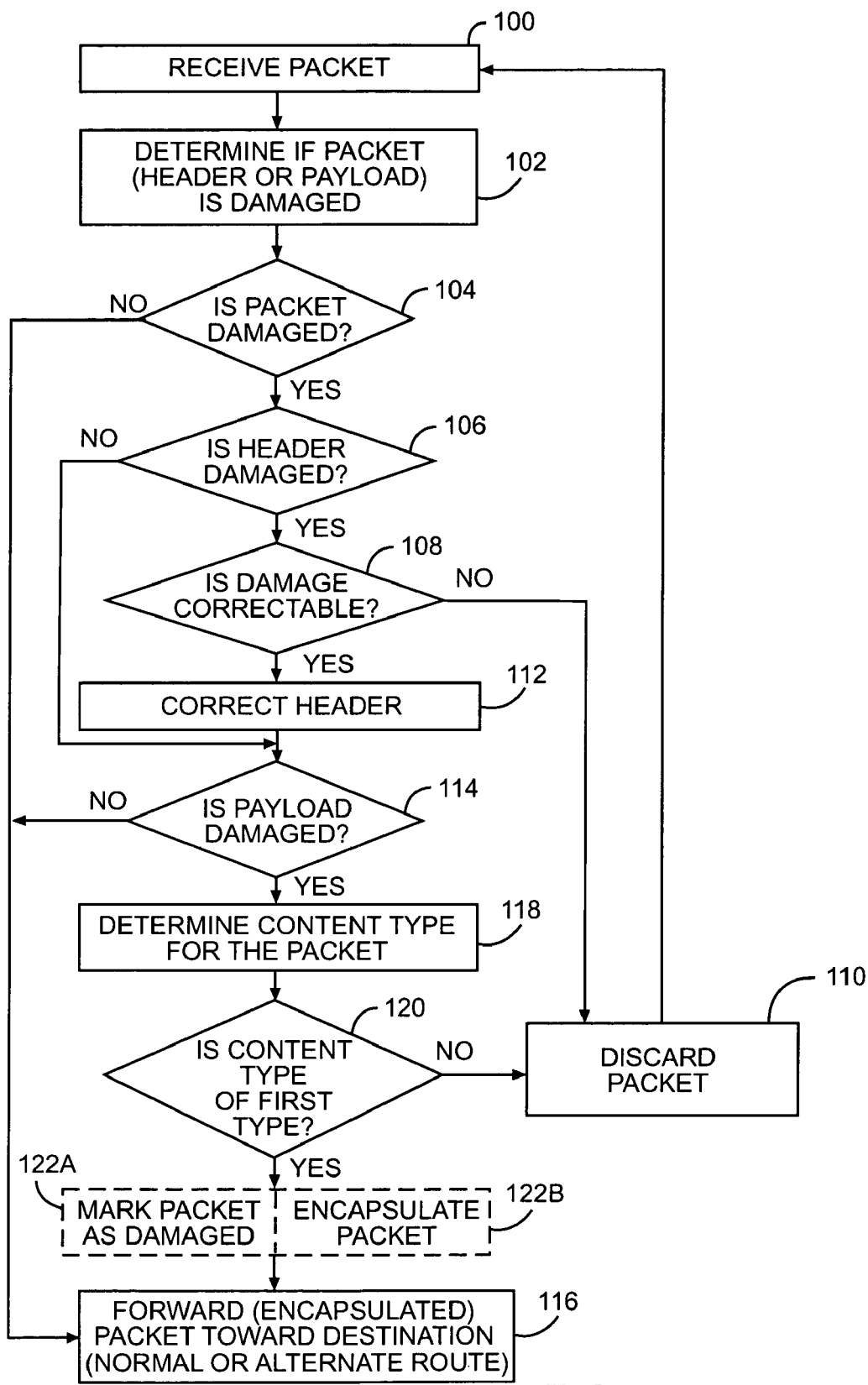
FIG. 2 is a flow diagram outlining a basic process for selectively forwarding damaged packets according to one embodiment of the present invention.

With reference to FIG. 2, an exemplary process for forwarding packets according to one embodiment of the present invention is illustrated. Initially, the packet forwarding device will receive a packet en route to the destination terminal 18 (step 100) and determine if the packet is damaged (step 102). The damage to the packet may be in the header, payload, or both. One technique for determining damage is to compare the packet with one or more of the checksums included within the packet. Notably, multiple checksums may be provided in the packet, wherein different checksums correspond to various protocol layers. When determining if a packet is damaged, the checksums at the currently used forwarding layer may be checked, as well as checksums at other layers. Those skilled in the art will recognize that any technique in which a packet can be analyzed for error may be used to determine that the packet is damaged.

If the packet is damaged (step 104), and there is damage in the header (step 106), a determination is made to see if the damage in the header is correctable (step 108). If the damage in the header cannot be corrected, the packet is discarded (step 110). If the header can be corrected, the header is corrected (step 112). If the header is not damaged (step 106) or a damaged header has been corrected, the next step depends on whether or not the payload is damaged (step 114). If there is no damage to the payload of the packet (step 114), the packet is forwarded toward its destination (step 116). If the payload is damaged (step 114), the packet is analyzed to determine the type of content carried in the packet (step 118).

The type of content carried in the packet may be detected using numerous techniques. For example, the type of protocol used for transport may be determinative of the content type. If the Real Time Protocol (RTP) is used, for example, the content type will likely be a streaming media type, which is more sensitive to timely delivery than data integrity. Although RTP is a Layer 3 protocol, the packet forwarding devices operating to forward the packets at a Layer 1 or Layer 2 protocol level may analyze other layers outside of the layer currently being used, in order to detect or otherwise determine the type of content carried in the packet. Further, certain protocols may include indicia indicative of the content type in the packet header or payload and at any protocol layer. Thus, the packet forwarding device may be configured to analyze the packet for indicia indicative of content type. Further, when information in the header is insufficient to determine content type, an analysis of the configuration of the data carried within the packet could also be used to determine content type. Those skilled in the art will recognize that the content type may be determined by analyzing any part of the packet and looking at any type of protocol used at any layer in the protocol stack to assist in determining content type, regardless of the layer in which the packet is currently being processed.

If the content type cannot be determined due to the damage to the packet or is not of the first type, which is sensitive to timely delivery, or where integrity is imperative (step 120), the packet is discarded (step 110) and the process repeats with the next incoming packet. If the content is of a type that is sensitive to timely delivery and less sensitive to integrity (step 120), the packet may optionally be encapsulated or marked as damaged by providing indicia indicative of the packet being damaged (steps 122A and 122B) and then the packet is forwarded toward the destination terminal 18 (step 116). Notably, marking damaged packets is optional. When damaged packets are not marked, each subsequent forwarding device will simply provide the above process, alone or in combination with another device, to determine whether the packet is damaged and whether the damaged packet should be forwarded toward the destination terminal 18. If the packets are marked, subsequent forwarding devices will preferably be able to detect the indicia used for marking and continue the forwarding process. Otherwise, the above process is repeated. If the damaged packet is encapsulated, subsequent forwarding devices will view the errant packet as the proper payload for the new packet.

Further, the functionality described above may be distributed among multiple devices, wherein a first packet forwarding device, such as the intermediate device 22 or edge device 20, may determine that the packet is damaged, and then forward the packet to the alternate processing device 24 to determine whether the damaged packet should be forwarded toward the destination terminal 18 or discarded. In addition to distributed processing, the packet forwarding devices may use alternate routes for routing damaged packets that should be forwarded toward the destination terminal 18 even though they are damaged. Using alternate routes is beneficial when normal routes may not include packet forwarding devices capable of forwarding damaged packets. As such, the alternate routes may be those routes in which the packet forwarding devices are capable of selectively forwarding damaged packets of the first type.

Figure 3:
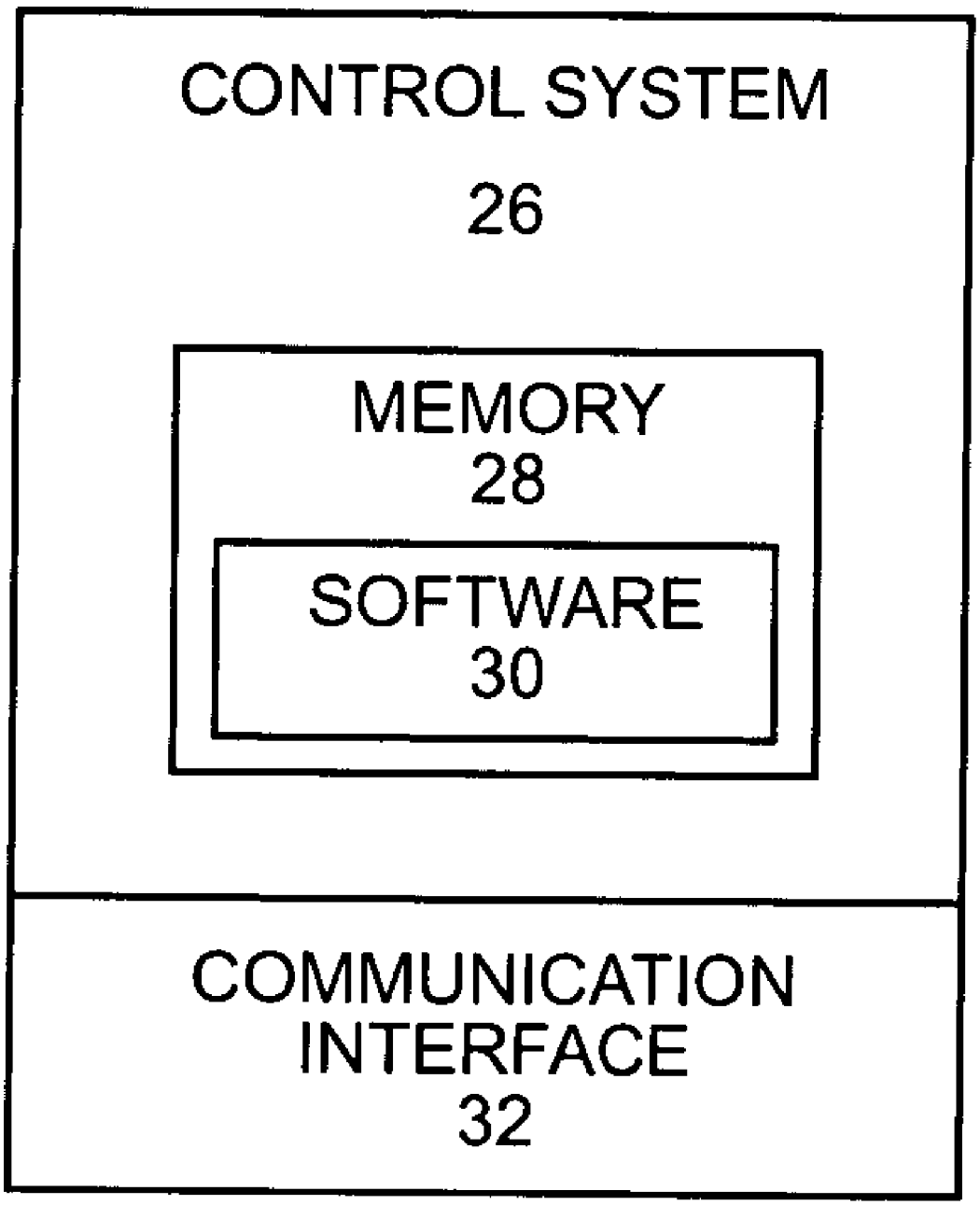
FIG. 3 is a block representation of a forwarding device according to one embodiment of the present invention.

Turning now to FIG. 3, a packet forwarding device is illustrated according to one embodiment of the present invention. The packet forwarding device will typically include a control system 26 having memory 28 sufficient for storing software 30 configured to provide the above functionality. The control system 26 is also associated with one or more communication interfaces 32, depending on the configuration of the packet forwarding device and its position within the communication environment 10. For example, if the packet forwarding device is an edge device 20, the communication interfaces 32 may include a first interface capable of receiving and transmitting packets via the packet network 12, and a second interface for facilitating communications with the originating or destination terminal 16, 18 via an appropriate access network 14. The second communication interface 32 could be a cellular interface, WLAN interface, or wireline interface of various configurations. A packet forwarding device configured as an intermediate device 22 or alternate processing device 24 may have one or more communication interfaces 32 configured to transmit packets back and forth between other intermediate devices 22 and alternate processing devices 24, as well as the edge devices 20. As previously described, the software providing the functionality for determining packet damage, determining what content is being transported, and what action to be taken can be distributed in multiple coordinating devices, all of which may have the basic structure illustrated in FIG. 3.

Although this disclosure has been described with reference to certain embodiments and generally associated methods, alterations and permutations of these embodiments and methods may become apparent through the teachings of this disclosure. Accordingly, the above description of example embodiments does not define or constrain this disclosure. Other changes, substitutions, improvements, modifications, and alterations are possible without departing from the spirit and scope of this disclosure, as defined by the following claims.

What is claimed is:

1. A method for forwarding damaged packets comprising:
   a) receiving a packet at a forwarding device; and
   b) when a payload of the packet is damaged;
      i) determining if the payload of the packet has a first type of content; and
      ii) if the payload of the packet has the first type of content, forwarding the packet towards a destination device from the forwarding device.

2. The method of claim 1 wherein the packet is received en route to the destination device from an originating device, the method further comprising determining if the packet is damaged.

3. The method of claim 2 wherein when the packet is damaged and does not have the first type of content, further comprising discarding the packet.

4. The method of claim 2 wherein determining the packet is damaged comprises checking an integrity of the packet against an included checksum.

5. The method of claim 4 wherein the packet is being forwarded at one protocol layer and the checksum is provided at a different protocol layer.

6. The method of claim 2 wherein when the packet is damaged, further comprising encapsulating the packet as a payload in a new packet, and forwarding the packet towards the destination via the new packet.

7. The method of claim 2 wherein when the packet is damaged, further comprising providing an indication of the packet being damaged in the packet.

8. The method of claim 2 wherein when the packet is damaged, the packet is forwarded over an alternate path, which is different from a path over which an undamaged packet would have been forwarded.

9. The method of claim 1 wherein the first type of content is content in which delivery is time sensitive.

10. The method of claim 1 wherein the first type of content is voice content.

11. The method of claim 1 wherein the first type of content is video content.

12. The method of claim 1 wherein the first type of content is audio content.

13. The method of claim 1 wherein the first type of content is streamed media.

14. The method of claim 1 wherein determining the payload of the packet has the first type of content comprises identifying a protocol being used to transport the content as one associated with the first type of content.

15. The method of claim 14 wherein the protocol being used to transport the content is at a layer different than that in which the packet is being forwarded.

16. The method of claim 1 further comprising determining if a header of the packet is damaged and either correcting the header or discarding the packet if the header cannot be corrected.

17. A packet forwarding device capable of forwarding damaged packets comprising:
   a) at least one communication interface; and
   b) a control system associated with the at least one communication interface and configured to:
      i) receive a packet; and
      ii) when a payload of the packet is damaged:
         A) determine if the payload of the packet has a first type of content; and
         B) if the payload of the packet has the first type of content, forward the packet towards a destination device.

18. The packet forwarding device of claim 17 wherein the packet is received en route to the destination device from an originating device, the control system further adapted to determine if the packet is damaged.

19. The packet forwarding device of claim 18 wherein when the packet is damaged and does not have the first type of content, the control system is further adapted to discard the packet.

20. The packet forwarding device of claim 18 wherein to determine the packet is damaged the control system is further adapted to check an integrity of the packet against an included checksum.

21. The packet forwarding device of claim 20 wherein the packet is being forwarded at one protocol layer and the checksum is provided at a different protocol layer.

22. The packet forwarding device of claim 18 wherein when the packet is damaged, the control system is further adapted to encapsulate the packet as a payload in a new packet, and forward the packet towards the destination via the new packet.

23. The packet forwarding device of claim 18 wherein when the packet is damaged, the control system is further adapted to provide an indication of the packet being damaged in the packet.

24. The packet forwarding device of claim 17 wherein when the packet is damaged, the packet is forwarded over an alternate path, which is different from a path over which an undamaged packet would have been forwarded.

25. The packet forwarding device of claim 17 wherein the first type of content is content in which delivery is time sensitive.

26. The packet forwarding device of claim 17 wherein the first type of content is voice content.

27. The packet forwarding device of claim 17 wherein the first type of content is video content.

28. The packet forwarding device of claim 17 wherein the first type of content is audio content.

29. The packet forwarding device of claim 17 wherein the first type of content is streamed media.

30. The packet forwarding device of claim 17 wherein to determine the payload of the packet has a first type of content the control system is further adapted to identify a protocol being used to transport the content as one associated with the first type of content.

31. The packet forwarding device of claim 30 wherein the protocol being used to transport the content is at a layer different than that in which the packet is being forwarded.

32. The packet forwarding device of claim 17 wherein the packet forwarding device is an edge device.

33. The packet forwarding device of claim 17 wherein the packet forwarding device is an intermediate device.

34. The packet forwarding device of claim 17 wherein the packet forwarding device is an alternate processing device.

35. The packet forwarding device of claim 17 wherein the control system is further adapted to determine if a header of the packet is damaged and either correcting the header or discarding the packet if the header cannot be corrected.

36. A system for forwarding damaged packets comprising:
   a) means for receiving a packet en route to a destination device from an originating device;
   b) means for determining if a payload of the packet is damaged;
   c) means for determining if the payload of the packet has a first type of content when the payload of the packet is damaged;
   d) means for forwarding the packet towards a destination device if the packet is damaged and has the first type of content; and
   e) means for discarding the packet when the packet is damaged and does not have the first type of content.

* * * * *